United States Patent
Liu et al.

(10) Patent No.: US 9,293,766 B2
(45) Date of Patent: Mar. 22, 2016

(54) LITHIUM NICKEL COBALT MANGANESE COMPOSITE OXIDE CATHODE MATERIAL

(71) Applicant: FU JEN CATHOLIC UNIVERSITY, New Taipei (TW)

(72) Inventors: Mao-Huang Liu, New Taipei (TW); Hsin-Ta Huang, New Taipei (TW)

(73) Assignee: FU JEN CATHOLIC UNIVERSITY, New Taipei (TW)

( * ) Notice: Subject to any disclaimer, the term of this patent is extended or adjusted under 35 U.S.C. 154(b) by 398 days.

(21) Appl. No.: 13/788,391

(22) Filed: Mar. 7, 2013

(65) Prior Publication Data

US 2013/0323598 A1    Dec. 5, 2013

(30) Foreign Application Priority Data

Jun. 1, 2012 (TW) .............................. 101119800 A

(51) Int. Cl.
*H01M 4/505* (2010.01)
*H01M 4/525* (2010.01)
*C01G 53/00* (2006.01)

(52) U.S. Cl.
CPC ............... *H01M 4/505* (2013.01); *C01G 53/50* (2013.01); *H01M 4/525* (2013.01); *C01P 2002/76* (2013.01); *C01P 2002/88* (2013.01); *C01P 2004/45* (2013.01); *C01P 2004/61* (2013.01); *C01P 2004/62* (2013.01); *C01P 2004/82* (2013.01); *C01P 2006/11* (2013.01); *C01P 2006/12* (2013.01); *Y02E 60/122* (2013.01); *Y02P 70/54* (2015.11)

(58) Field of Classification Search
CPC ....................................................... H01M 4/049
See application file for complete search history.

(56) References Cited

U.S. PATENT DOCUMENTS

2009/0068561 A1* 3/2009 Sun et al. ...................... 429/223

* cited by examiner

*Primary Examiner* — Jacob Marks
(74) *Attorney, Agent, or Firm* — Muncy, Geissler, Olds & Lowe, P.C.

(57) ABSTRACT

A lithium nickel cobalt manganese composite oxide cathode material includes a plurality of secondary particles. Each secondary particle consists of aggregates of fine primary particles. Each secondary particle includes lithium nickel cobalt manganese composite oxide, which is expressed as $Li_aNi_{1-b-c}Co_bMn_cO_2$. An average formula of each secondary particle satisfies one condition of $0.9 \leq a \leq 1.2$, $0.08 \leq b \leq 0.34$, $0.1 \leq c \leq 0.4$, and $0.18 \leq b+c \leq 0.67$. The lithium nickel cobalt manganese composite oxide has a structure with different chemical compositions of primary particles from the surface toward core of each of the secondary particles. The primary particle with rich Mn content near the surface and the primary particle with rich Ni content in the core of the secondary particle of the lithium nickel cobalt manganese composite oxide cathode material have provided the advantages of high safety and high capacity.

8 Claims, 4 Drawing Sheets

LITHIUM NICKEL COBALT MANGANESE COMPOSITE OXIDE CATHODE MATERIAL

BACKGROUND OF THE INVENTION

1. Field of the Invention

The present invention relates to a lithium nickel cobalt manganese composite oxide cathode material, more specifically to a lithium nickel cobalt manganese composite oxide is basically formed secondary particles consisting of aggregates of fine primary particles, each having a structure with different chemical composition of primary particles from the surface toward core of each of the secondary particles.

2. The Prior Arts

Recently, lithium battery are broadly applied in notebook computers, cell phones, PDAs, video cameras, digital cameras, mini CD-ROMs, hand-held terminals, and Bluetooth™ earphone, etc. The 3C products in the coming futures demand not only the characteristics of thin, light, and compact but also require high energy storage, high resolution, and dynamic true color in product specification. Therefore, high energy density, thinner and portable lithium battery is the current trend of development. In addition, in the trend of environmentally technology and green energy, electric bicycles, electric motorcycles and electric hybrid cars will be developed in mass production in the near future. These transport vehicles require the power sources of batteries, which have characteristics of high power, high capacity, high safety but low cost.

Cathode material used on a lithium battery not only affects the performance of the battery, but also influences the safety of the lithium battery. Therefore, a good cathode material for applying in the lithium battery is defined to have high specific capacity and high thermal stability, which means high safety. Lithium cobalt oxide ($LiCoO_2$) has popularly used in lithium battery for many years; however, the raw material is expensive and toxicant to the environment. In addition, the capacity and performance of $LiCoO_2$ is difficult to be improved. Lithium nickel oxide ($LiNiO_2$) with a high capacity, low price and less toxicity is developed for replacing $LiCoO_2$. However, the $LiNiO_2$ is unsafe and poor cycleability. Therefore, $LiNiO_2$ is difficult to use in lithium battery. Lithium manganese oxide ($LiMn_2O_4$) provides better safety characteristic, but the specific capacity is too low to satisfy the battery demand of high capacity. Partial substitution of Ni by other metal cations has been made to enhance the $LiNiO_2$ electrochemical performance. In particular, the solid solution, Lithium nickel cobalt manganese composite oxides ($Li_aNi_{1-b-c}Co_bMn_cO_2$), has been suggested as an alternative to $LiCoO_2$ as it combines some of the benefits of $LiNiO_2$ (capacity) with those of $LiCoO_2$ (stability) and $LiMn_2O_4$ (safety).

Recently, the lithium nickel cobalt manganese composite oxide cathode material has widely utilized in many commercialized products. But a key problem of lithium nickel cobalt manganese composite oxide is that it is difficult to obtain a high-safety and high-capacity material which formula is with the higher manganese and the higher nickel content at the some time. In order to resolve the problem, some researcher select lithium nickel cobalt manganese composite oxide with low manganese content to decrease the capacity loss, and dopes other metal element into the lithium nickel cobalt manganese composite oxide to enhance the stability of structure. Although the stability of structure has much improved and provides better safety than pristine lithium nickel cobalt manganese composite oxide, however, the capacity of the cathode is still reduced.

In these years, some researchers provide a method to coat a nano-protective layer on the surface of lithium nickel cobalt manganese composite oxide in order to prevent the HF attack from the electrolyte, thereby ensuring the structure of material. However, the method can decrease the exothermic heat, but can not raise the thermal-decomposition temperature. In addition, it is hard to control the thickness of coated layer and mass production.

Other researchers provide a core-shell complex structure of cathode material, which uses the lithium nickel cobalt manganese composite oxide as a core of cathode material, and a thermal-stability cathode material covered on the surface of the lithium nickel cobalt manganese composite oxide to form a protective shell. For example, the thermal stability cathode material is lithium iron phosphate and the thickness of the protective shell is 1~2 μm. This structure greatly improves the safety of material; however, the interface resistance inside the material is also increase, such that the discharge performance is decreased under high-rate test. Moreover, the synthesis of material with core-shell structure is hard to control the quality in mass production.

SUMMARY OF THE INVENTION

An objective of the present invention to provide a lithium nickel cobalt manganese composite oxide cathode material, which is formed secondary particles consisting of aggregates of fine primary particles. Each secondary particle includes a lithium nickel cobalt manganese composite oxide, which is expressed as $Li_aNi_{1-b-c}Co_bMn_cO_2$, an average formula of secondary particle satisfies one condition of $0.9 \leq a \leq 1.2$, $0.08 \leq b \leq 0.34$, $0.1 \leq c \leq 0.4$, and $0.18 \leq b+c \leq 0.67$, the lithium nickel cobalt manganese composite oxide has a structure with different chemical compositions of primary particles from the surface toward core of each of the secondary particles.

The different chemical compositions of primary particle of the lithium nickel cobalt manganese composite oxide cathode material are that lithium content is uniformly distributed from a surface toward a core of the secondary particle, nickel content is increased from the surface toward the core of the secondary particle, cobalt content is increased from the surface toward the core of the secondary particle, and manganese content thereof is decreased from the surface toward the core of the secondary particle.

The formula of primary particle near the surface of the secondary particle of the lithium nickel cobalt manganese composite oxide cathode material is expressed as $Li_xNi_{1-y-z}Co_yMn_zO_2$, wherein $0.9 \leq x \leq 1.2$, $0.03 \leq y \leq 0.3$, $0.15 \leq z \leq 0.6$, and the formula of primary particle in the core of the secondary particle of the lithium nickel cobalt manganese composite oxide cathode material is expressed as $Li_{x'}Ni_{1-y'-z'}Co_{y'}Mn_{z'}O_2$, wherein $0.9 \leq x' \leq 1.2$, $0.088 \leq y' \leq 0.51$, $0 \leq z' \leq 0.3$, and $x=x'$, $z>z'$, $y<y'$, $y+z>y'+z'$.

The primary particle of the lithium nickel cobalt manganese composite oxide cathode material has an average particle size of 30~700 nm, and the average particle size ($D_{50}$) of the secondary particle of the lithium nickel cobalt manganese composite oxide cathode material is 0.5~25 μm. Moreover, the cathode material is a R-3m rhombohedral structure, and the tap density of the cathode material is greater than 1.5 $g/cm^3$, and specific surface area of the cathode material is within 0.1~20 $m^2/g$.

Therefore, the lithium nickel cobalt manganese composite oxide cathode material of the present invention consists of primary particle with different chemical formula, the primary particle with rich Mn content near the surface of the secondary particle provides a high thermal stability for the material, and the primary particle with rich Ni content in the core of the secondary particle provides a high capacity, such that the lithium nickel cobalt manganese composite oxide cathode material has two advantages above, and satisfy the battery demand of high power, high capacity, and high safety.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The details of the preferred embodiments of the present invention will be described in the subsequent content with reference to the accompanying drawings, such that the present invention can be implemented people with skills based on the content.

Figure 1:
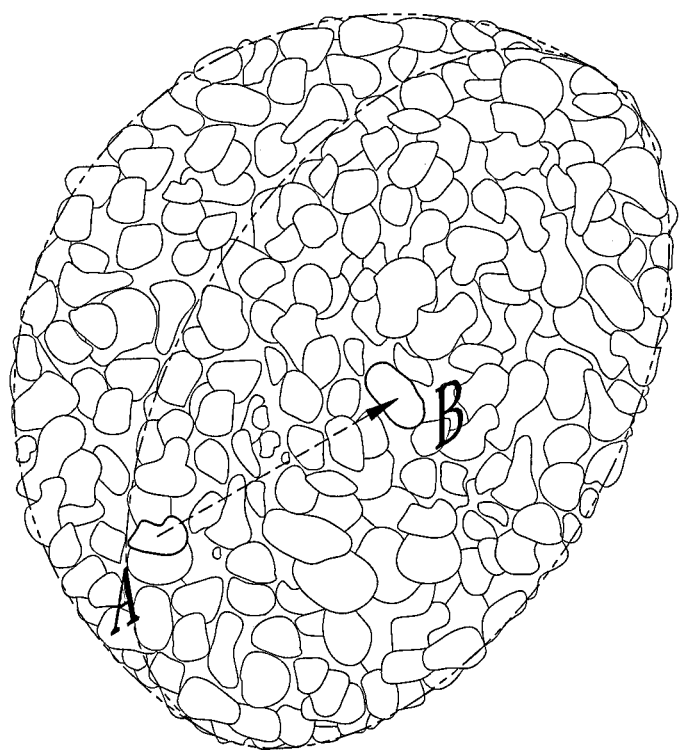
FIG. 1 is a structure diagram of secondary particle of a cathode material in accordance with the present invention.

FIG. 1 illustrates a structure diagram of secondary particle of the lithium nickel cobalt manganese composite oxide of the present invention. The lithium nickel cobalt manganese composite oxide cathode material includes a plurality of secondary particles; each secondary particle consists of aggregates of fine primary particles. Each secondary particle includes a lithium nickel cobalt manganese composite oxide, which is expressed as $Li_aNi_{1-b-c}Co_bMn_cO_2$, an average formula of each secondary particle satisfying one condition of $0.9 \leq a \leq 1.2$, $0.08 \leq b \leq 0.34$, $0.1 \leq c \leq 0.4$, and $0.18 \leq b+c \leq 0.67$. The lithium nickel cobalt manganese composite oxide has a structure with different chemical compositions of primary particles from the surface toward core of each of the secondary particles.

As shown in FIG. 1, A is one primary particle near the surface of the secondary particle while B is the core of the secondary particle.

The different chemical compositions of primary particle of the lithium nickel cobalt manganese composite oxide cathode material is that lithium content is distributed uniformly from the surface of the secondary particle toward the core of the secondary particle, nickel content is increased from the surface of the secondary particle toward the core of the secondary particle, cobalt content is increased from the surface of the secondary particle toward the core of the secondary particle, and manganese content thereof is decreased from the surface of the secondary particle toward the core of the secondary particle.

Therefore, an example is shown in FIG. 1, the content of lithium is uniformly distributed from A to B, the content of nickel is increased from A to B, the content of cobalt is increased from A to B, and the content of manganese is decreased from A to B.

The formula of the primary particle near the surface of the secondary particle, as A shown in FIG. 1, is expressed as $Li_xNi_{1-y-z}Co_yMn_zO_2$, wherein $0.9 \leq x \leq 1.2$, $0.03 \leq y \leq 0.3$, $0.15 \leq z \leq 0.6$, and the formula of the primary particle at the core of the secondary particle, as B shown in FIG. 1, is expressed as $Li_{x'}Ni_{1-y'-z'}Co_{y'}Mn_{z'}O_2$, wherein $0.9 \leq x' \leq 1.2$, $0.088 \leq y' \leq 0.51$, $0 \leq z' \leq 0.3$, and $x=x'$, $z>z'$, $y<y'$, $y+z>y'+z'$.

The primary particle of the lithium nickel cobalt manganese composite oxide cathode material has an average particle size 30~700 nm, and the average particle size ($D_{50}$) of the secondary particle of the lithium nickel cobalt manganese composite oxide cathode material is 0.5~25 μm.

The cathode material is a R-3m rhombohedral structure, and the tap density of the cathode material is greater than 1.5 g/cm$^3$, and the specific surface area of the cathode material is within 0.1~20 m$^2$/g.

An embodiment and a comparative example are provided as following and an analysis is conducted to illustrate the physical and electrochemical characteristics to prove improvement in performance.

Embodiment

1. Synthesis of a Lithium Nickel Cobalt Manganese Composite Oxide Cathode Material Consisting of Primary Particles with Different Chemical Compositions A spherical nickel cobalt hydroxide was synthesized by chemical co-precipitation, and then a layer of manganese hydroxide was uniformly coated on the surface of the spherical nickel cobalt hydroxide in a nitrogen atmosphere by chemical co-precipitation. The precursor was mixed with lithium hydroxide (LiOH.H$_2$O) powder. The mole ratio of lithium and sum of nickel, cobalt, and manganese is 1.02:1.00. The mixture was calcined at 800° C. in an oxygen atmosphere for 12 hours, and finally the lithium nickel cobalt manganese composite oxide cathode material is obtained, which consists of primary particles with different chemical compositions. In brief, use DC-LiNi$_{0.72}$Co$_{0.18}$Mn$_{0.1}$O$_2$ in the following as the lithium nickel cobalt manganese composite oxide cathode material synthesized by this experiment.

2. Electrochemical Measurements

Cathode films were prepared by mixing the DC-LiNi$_{0.72}$Co$_{0.19}$Mn$_{0.1}$O$_2$ cathode material, KS6 graphite, Super-P carbon-black and polyvinylidene fluoride (PVdF), as a binder, in an 88:4:2:6 (wt. %) ratio. N-methyl pyrrolidinone (NMP) was used as the solvent. The slurry was obtained after mixing carbon-black, active material and PVdF binder with the NMP solvent. The resultant slurry was cast on 20 μm Al foil using a 200 μm doctor blade. The coated Al foil was dried at 120° C. for 2 hours to evaporate the NMP solvent.

The coated foil was roll-pressed and punched to form a circular disk (12 mm in diameter). The loading density of electrode disk is ~18 mg/cm$^2$. The electrode films were preserved in an argon-filled dry box. In the coin cell, the DC-LiNi$_{0.72}$Co$_{0.18}$Mn$_{0.1}$O$_2$ electrode disk served as the cathode, and the lithium metal foil functioned as the anode. A mixture of ethylene carbonate (EC), diethyl carbonate (DEC), and propylene carbonate (PC) (EC:DEC:PC=30:50:20 vol. %) solvents containing 1 M LiPF$_6$ was used as an electrolyte. The polypropylene membrane was soaked in the electrolyte for 24 hours prior to use.

The coin cell has a charge/discharge range of 2.8~4.3 V, and a charge/discharge current of 0.1~6.0 C to measure the electrochemical characteristics of DC-LiNi$_{0.72}$Co$_{0.18}$Mn$_{0.1}$O$_2$ cathode material.

3. Thermal Evaluation

DC-LiNi$_{0.72}$Co$_{0.18}$Mn$_{0.1}$O$_2$ samples for differential scanning calorimetry (DSC) were prepared as follows. Cells were initially charged to 4.3 V at a 0.1 C rate. The cells were then opened in an argon-filled dry box to remove the charged cathode samples. Approximately 3 mg of the cathode with 3 µL electrolyte was hermetically sealed in an aluminum pan. DSC scanning was carried out at a scan rate of 5° C. min$^{-1}$ from 180~300° C.

Comparative Example

1. Synthesis of a Lithium Nickel Cobalt Manganese Composite Oxide Cathode Material Consisting of Primary Particles with Uniform Chemical Composition Spherical nickel cobalt manganese hydroxide was synthesized by chemical co-precipitation, and then lithium hydroxide was added to mix together, wherein, the mole ratio of lithium and sum of nickel, cobalt and manganese is 1.02:1.00. The mixture was calcined at 800° C. in an oxygen atmosphere for 12 hours, and finally the lithium nickel cobalt manganese composite oxide cathode material is obtained, which consists of primary particles with uniform chemical composition. In brief, use AC-LiNi$_{0.72}$Co$_{0.18}$Mn$_{0.1}$O$_2$ in the following as the lithium nickel cobalt manganese composite oxide cathode material is synthesized by the comparative example.

2. Electrochemical Measurements

The only difference from the above experiment, AC-LiNi$_{0.72}$Co$_{0.18}$Mn$_{0.1}$O$_2$ is used as the cathode material; the other steps remain the same as the above experiment. And then, use the same method to test the electrochemical characteristics of AC-LiNi$_{0.72}$Co$_{0.18}$Mn$_{0.1}$O$_2$.

3. Thermal Evaluation

The coin cells of AC-LiNi$_{0.72}$Co$_{0.18}$Mn$_{0.1}$O$_2$ were initially charged to 4.3 V at a 0.1 C rate. The cells were then opened in an argon-filled dry box to remove the charged cathode samples. Approximately 3 mg of the cathode with 3 µL electrolyte was hermetically sealed in an aluminum pan. DSC scanning was carried out at a scan rate of 5° C. min$^{-1}$ from 180~300° C.

[Analysis Result]

1. Analysis of Physical Characteristics

Figure 2:
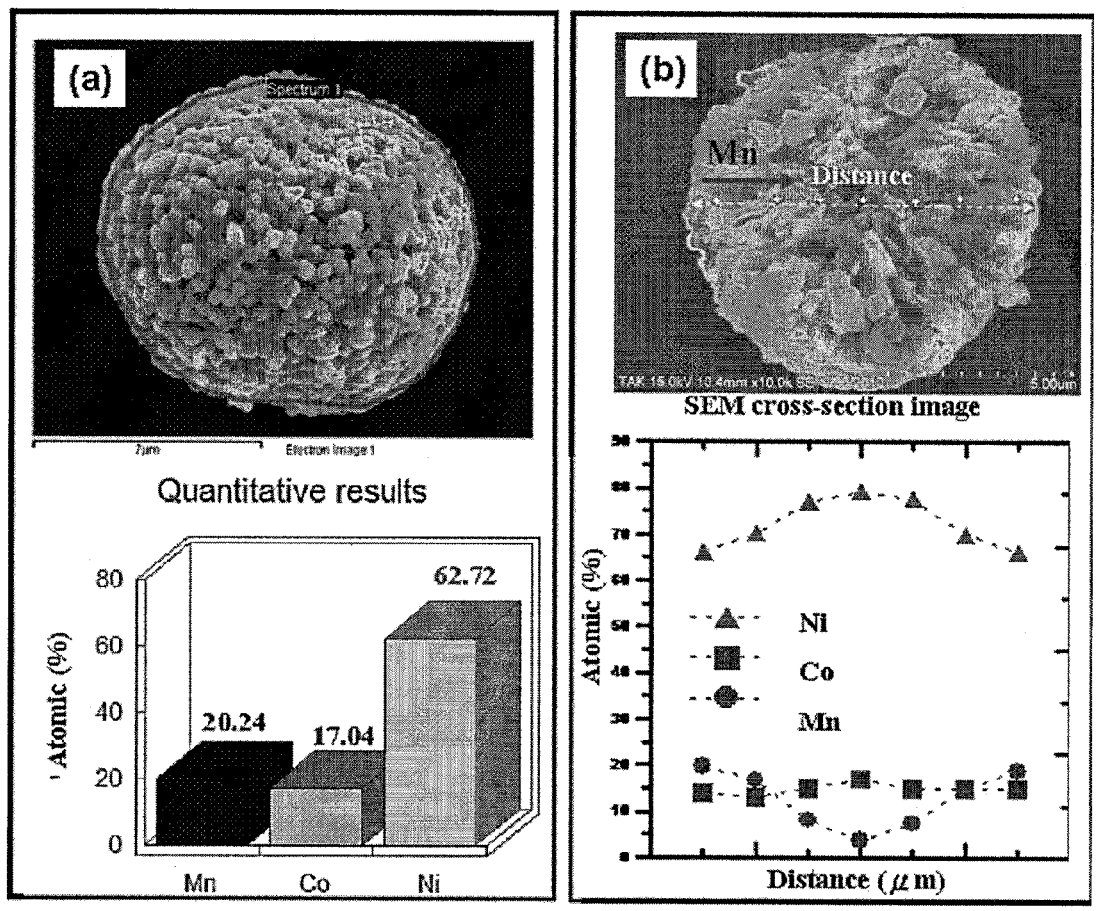
FIG. 2(a) shows the morphology and element ratio of the surface of the embodiment.
FIG. 2(b) shows the morphology and compositional change of the cross section of the embodiment.

FIG. 2 illustrates the quantitative elementary analysis results of DC-LiNi$_{0.72}$Co$_{0.18}$Mn$_{0.1}$O$_2$ cathode material of the present invention. The quantitative elementary analysis of the DC-LiNi$_{0.72}$Co$_{0.18}$Mn$_{0.1}$O$_2$ cathode material is performed by using inductive couple plasma (ICP) and energy dispersive spectrometer (EDS) on the surface and cross section of the DC-LiNi$_{0.72}$Co$_{0.18}$Mn$_{0.1}$O$_2$ cathode material.

FIG. 2(a) shows the surface morphology and the element ratio of the surface of the DC-LiNi$_{0.72}$Co$_{0.18}$Mn$_{0.1}$O$_2$ cathode material, and FIG. 2(b) shows the cross section morphology and the compositional change of the cross section of the DC-LiNi$_{0.72}$Co$_{0.18}$Mn$_{0.1}$O$_2$ cathode material.

The mole ratio of Ni:Co:Mn of DC-LiNi$_{0.72}$Co$_{0.18}$Mn$_{0.1}$O$_2$ cathode material is measured by ICP as 71.96:17.92:10.12. As shown in FIG. 2(a), the mole ratio of Ni:Co:Mn of primary particle near the surface of DC-LiNi$_{0.72}$Co$_{0.18}$Mn$_{0.1}$O$_2$ cathode material is 62.72:17.04:20.24. As shown in FIG. 2(b), Mn is diffused to inner of DC-LiNi$_{0.72}$Co$_{0.18}$Mn$_{0.1}$O$_2$ cathode material and the mole ratio of Ni:Co:Mn had been changed after sintering in high temperature. The mole ratio of Ni:Co:Mn of primary particle in the core of DC-LiNi$_{0.72}$Co$_{0.18}$Mn$_{0.1}$O$_2$ cathode material is 80.14:18.15:1.71.

2. Analysis of Electrochemical Characteristics

Figure 3:
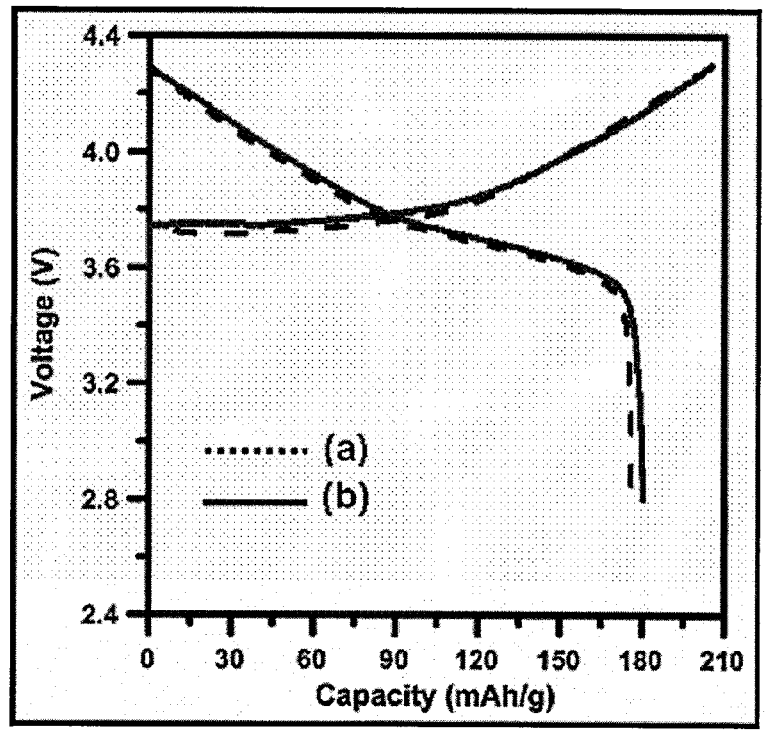
FIG. 3 is a comparison diagram in the initial charge-discharge curves of (a) comparative example and (b) embodiment in the voltage range of 2.8~4.3V at current level of 0.1C.

FIG. 3 is a diagram for comparing the charge/discharge electrochemical characteristics in small current between the embodiment and comparative example. The curve (a) shows the comparative example (AC-LiNi$_{0.72}$Co$_{0.18}$Mn$_{0.1}$O$_2$) and the curve (b) shows the embodiment (DC-LiNi$_{0.72}$Co$_{0.18}$Mn$_{0.1}$O$_2$). The difference between embodiment (DC-LiNi$_{0.72}$Co$_{0.18}$Mn$_{0.1}$O$_2$) and the comparative example (AC-LiNi$_{0.72}$Co$_{0.18}$Mn$_{0.1}$O$_2$) can be found by charge/discharge in small current (0.1C). Within the voltage range 2.8~4.3 V, the discharge capacity of embodiment (DC-LiNi$_{0.72}$Co$_{0.18}$Mn$_{0.1}$O$_2$) is 180.4 mAh/g, and irreversible capacity of embodiment (DC-LiNi$_{0.72}$Co$_{0.18}$Mn$_{0.1}$O$_2$) is 25.6 mAh/g; the discharge capacity of comparative example (AC-LiNi$_{0.72}$Co$_{0.18}$Mn$_{0.1}$O$_2$) is 176.1 mAh/g and irreversible capacity of comparative example (AC-LiNi$_{0.72}$Co$_{0.18}$Mn$_{0.1}$O$_2$) is 29.8 mAh/g.

Figure 4:
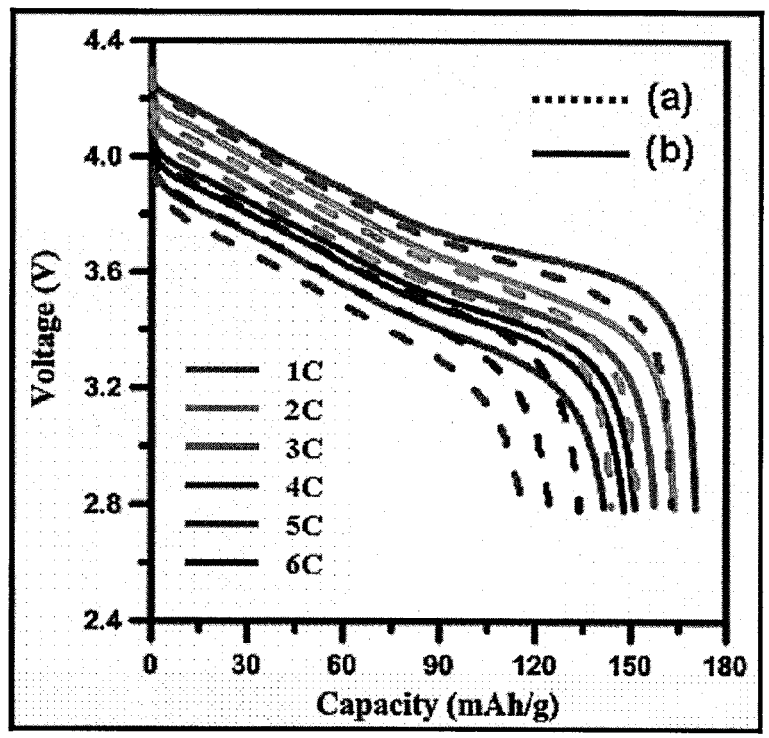
FIG. 4 is a comparison diagram in the discharge capability at various currents between (a) comparative example and (b) embodiment.

FIG. 4 is a diagram for comparing the electrochemical characteristics of discharge in various currents between the embodiment and comparative example. The curve (a) shows the comparative example (AC-LiNi$_{0.72}$Co$_{0.18}$Mn$_{0.1}$O$_2$) and the curve (b) shows the embodiment (DC-LiNi$_{0.72}$Co$_{0.18}$Mn$_{0.1}$O$_2$). The current conditions are charging in 0.2C and discharging in 1 C~6 C and the range of working voltage is 2.8~4.3 V. It is obviously observed that the embodiment (DC-LiNi$_{0.72}$Co$_{0.18}$Mn$_{0.1}$O$_2$) has a higher discharge potential plateau, which has ~83% of origin capacity (0.1C) under 6C discharge; however, the comparative example (AC-LiNi$_{0.72}$Co$_{0.18}$Mn$_{0.1}$O$_2$) only has ~71% of origin capacity (0.1C).

Figure 5:
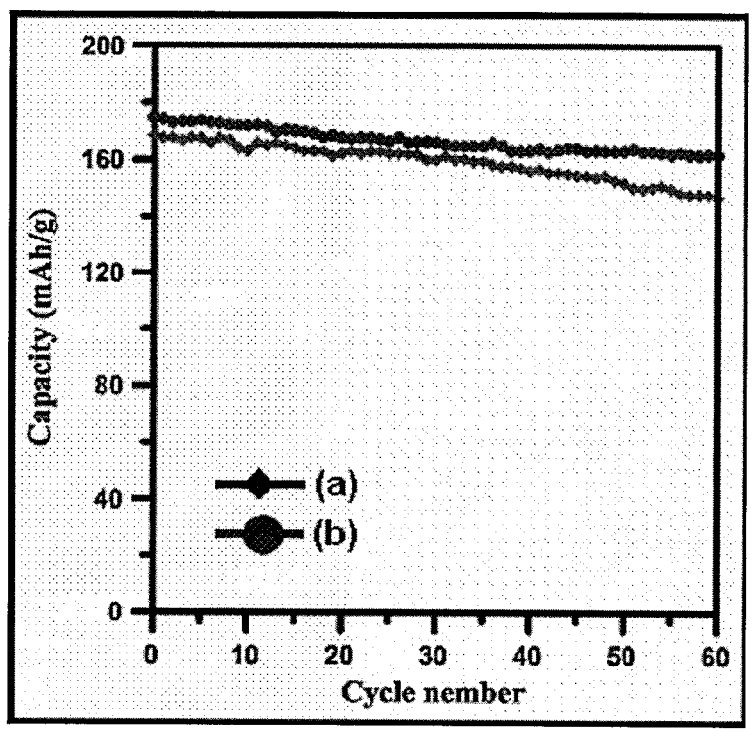
FIG. 5 is a comparison diagram in cycle life of (a) comparative example and (b) embodiment.

FIG. 5 is a diagram for comparing the cycle life between the embodiment and comparative example. The curve (a) shows the comparative example (AC-LiNi$_{0.72}$Co$_{0.18}$Mn$_{0.1}$O$_2$) and the curve (b) shows the embodiment (DC-LiNi$_{0.72}$Co$_{0.18}$Mn$_{0.1}$O$_2$) After 60 Charge/Discharge cycles under 0.5C in voltage range 2.8~4.3 V, it shows that the embodiment (DC-LiNi$_{0.72}$Co$_{0.18}$Mn$_{0.1}$O$_2$) has ~92.7% of initial capacity, and the comparative example (AC-LiNi$_{0.72}$Co$_{0.18}$Mn$_{0.1}$O$_2$) only has ~86.2% of initial capacity. Summarizing the results described above, it can be obviously observed that the embodiment (DC-LiNi$_{0.72}$Co$_{0.18}$Mn$_{0.1}$O$_2$) has better charge/discharge characteristics.

Figure 6:
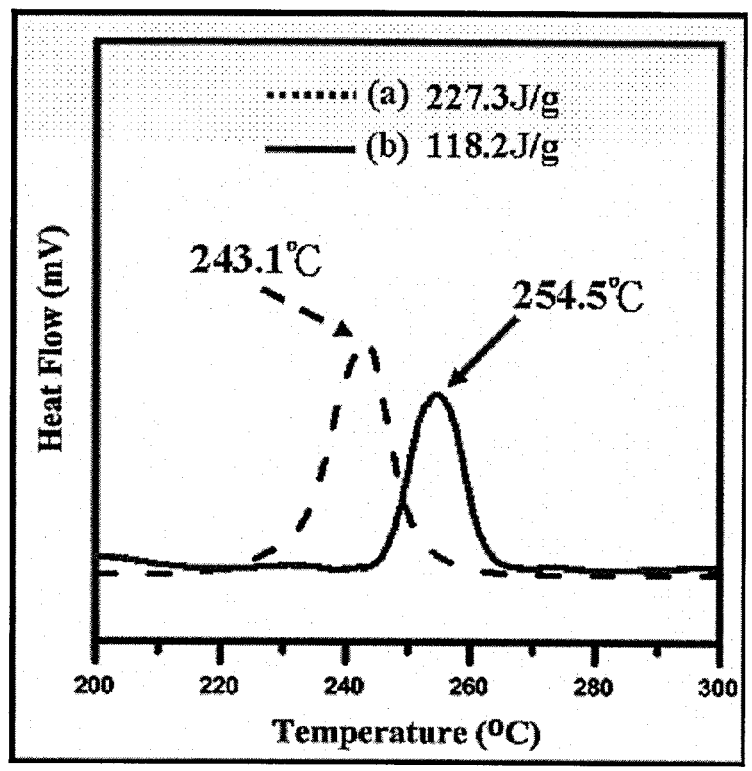
FIG. 6 is a comparison diagram tested by a differential scanning calorimeter with regard to released heat-flow of (a) comparative example and (b) embodiment.

FIG. 6 is a diagram for showing DSC test of the embodiment and comparative example. The curve (a) shows the comparative example (AC-LiNi$_{0.72}$Co$_{0.18}$Mn$_{0.1}$O$_2$) and the curve (b) shows the embodiment (DC-LiNi$_{0.72}$Co$_{0.18}$Mn$_{0.1}$O$_2$). The results of FIG. 6 show that the exothermic temperature of the comparative example (AC-LiNi$_{0.72}$Co$_{0.18}$Mn$_{0.1}$O$_2$) is 243.1° C., and the exothermic temperature of the (DC-LiNi$_{0.72}$Co$_{0.18}$Mn$_{0.1}$O$_2$) is shifted to 254.5° C. Moreover, the exothermic heat is decreased from 227.3 J/g to 118.2 J/g. Summarizing the results described above; the embodiment (DC-LiNi$_{0.72}$Co$_{0.18}$Mn$_{0.1}$O$_2$) has better thermal stability.

The main technical characteristic is to provide a new lithium nickel cobalt manganese composite oxide cathode material consisting of primary particles with different chemical compositions. Since the lithium nickel cobalt manganese composite oxide cathode material is not formed by doping different metal element or modification with protective layer, such that there is no obvious interface resistance in the particle and inactive regions which decreases the capacity. High thermal-stability property has been provided based on the rich Mn content near the surface of the secondary particle, moreover, high capacity has been provided based on the rich Ni content in the core of the secondary particle. The lithium nickel cobalt manganese composite oxide cathode material of present invention has advantages of high thermal stability and high capacity, keeps the stable surface-structure of material, raises the safety, and does not decrease the specific capacity of the material. The present invention achieves the objects of high safety and high capacity and satisfies the demand of high power, high energy and high safety of lithium battery.

Another technical characteristic of the present invention is that lithium nickel cobalt manganese composite oxide cathode material consisting of primary particles with different chemical composition can be applied in lithium secondary battery, which includes the lithium battery packaging by cylinder or rectangular stainless steel, aluminum or aluminum alloy can. The lithium nickel cobalt manganese composite oxide cathode material of the present invention can also be applied in the polymer lithium battery packaging by thermo-compression bonding or other packaging method with aluminum foil bag. The lithium nickel cobalt manganese composite oxide cathode material can enhance the safety and capacity of the lithium battery.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lithium nickel cobalt manganese composite oxide cathode material, comprising:
    a plurality of secondary particles, each of the secondary particles consisting of aggregates of fine primary particles, and each of the secondary particles including a lithium nickel cobalt manganese composite oxide, which is expressed as Li$_a$Ni$_{1-b-c}$Co$_b$Mn$_c$O$_2$, an average formula of each secondary particle satisfying one condition of 0.9≤a≤1.2, 0.08≤b≤0.34, 0.1≤c≤0.4, and 0.18≤b+c≤0.67;
    wherein, the lithium nickel cobalt manganese composite oxide has a structure with different chemical compositions of primary particles from the surface toward core of each of the secondary particles;
    wherein, the lithium nickel cobalt manganese composite oxide cathode material is formed by coating manganese hydroxide on the surface of nickel cobalt hydroxide, then mixing with lithium hydroxide to form a mixture, and finally sintering the mixture to obtain the cathode material.

2. The lithium nickel cobalt manganese composite oxide cathode material as claimed in claim 1, wherein the different chemical compositions includes lithium content uniformly distributed from the surface toward the core, nickel content increased from the surface toward the core, cobalt content increased from the surface toward the core, and manganese content decreased from the surface toward the core in each of the secondary particles.

3. The lithium nickel cobalt manganese composite oxide cathode material as claimed in claim 2, wherein the formula of primary particle near the surface of each secondary particle of the lithium nickel cobalt manganese composite oxide cathode material is expressed as Li$_x$Ni$_{1-y-z}$Co$_y$Mn$_z$O$_2$, wherein 0.9≤x≤1.2, 0.03≤y≤0.3, 0.15≤z≤0.6, and the formula of primary particle in the core of each secondary particle of the lithium nickel cobalt manganese composite oxide cathode material is expressed as Li$_{x'}$Ni$_{1-y'-z'}$Co$_{y'}$Mn$_{z'}$O$_2$, wherein 0.9≤x'≤1.2, 0.088≤y'≤0.51, 0≤z'≤0.3, and x=x', z>z', y≤y', y+z>y'+z'.

4. The lithium nickel cobalt manganese composite oxide cathode material as claimed in claim 3, wherein each of the primary particles has an average particle size of 30~700 nm.

5. The lithium nickel cobalt manganese composite oxide cathode material as claimed in claim 4, wherein each of the secondary particles has an average particle size (D50) of 0.5~25 μm.

6. The lithium nickel cobalt manganese composite oxide cathode material as claimed in claim 1, wherein the cathode material is a R-3m rhombohedral structure.

7. The lithium nickel cobalt manganese composite oxide cathode material as claimed in claim 1, wherein tap density of the cathode material is greater than 1.5 g/cm3.

8. The lithium nickel cobalt manganese composite oxide cathode material as claimed in claim 1, wherein a specific surface area of the cathode material is within 0.1~20 m2/g.

* * * * *